(12) United States Patent
Nakanishi

(10) Patent No.: US 11,372,760 B2
(45) Date of Patent: Jun. 28, 2022

(54) STORAGE CONTROL DEVICE FOR CONTROLLING CACHE MEMORY BASED ON ACCESS FREQUENCIES

(71) Applicant: SONY SEMICONDUCTOR SOLUTIONS CORPORATION, Atsugi (JP)

(72) Inventor: Kencihi Nakanishi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,388

(22) PCT Filed: Apr. 15, 2019

(86) PCT No.: PCT/JP2019/016105
§ 371 (c)(1),
(2) Date: Jan. 14, 2021

(87) PCT Pub. No.: WO2020/021791
PCT Pub. Date: Jan. 30, 2020

(65) Prior Publication Data
US 2021/0294745 A1    Sep. 23, 2021

(30) Foreign Application Priority Data

Jul. 26, 2018  (JP) .............................. JP2018-140104

(51) Int. Cl.
*G06F 12/08* (2016.01)
*G06F 12/0831* (2016.01)
(Continued)

(52) U.S. Cl.
CPC ...... *G06F 12/0833* (2013.01); *G06F 12/0238* (2013.01); *G06F 12/0646* (2013.01); *G06F 12/0891* (2013.01)

(58) Field of Classification Search
None
See application file for complete search history.

(56) References Cited

U.S. PATENT DOCUMENTS 8,688,904 B1 * 4/2014 Ari .......................... G06F 3/068
                                                711/111
9,606,937 B1 * 3/2017 Marathe ................ G06F 12/122
(Continued)

FOREIGN PATENT DOCUMENTS

JP    2000-047942 A    2/2000
JP    2011-141754 A    7/2011
(Continued)

OTHER PUBLICATIONS

International Search Report and Written Opinion of PCT Application No. PCT/JP2019/016105, dated May 28, 2019, 07 pages of ISRWO.

*Primary Examiner* — Tracy C Chan
(74) *Attorney, Agent, or Firm* — Chip Law Group

(57) ABSTRACT

Only data with a high access frequency is registered to a cache storage. A cache storage stores part of data stored in a main storage. A cache management unit holds an access frequency for each cache entry in the cache storage. A candidate cache management unit holds the access frequency for each candidate entry not registered to the cache storage. A cache update unit updates the access frequency according to an address of an issued access command and updates the cache entry and the candidate entry based on the access frequency.

11 Claims, 12 Drawing Sheets

(51) Int. Cl.
    *G06F 12/02*     (2006.01)
    *G06F 12/06*     (2006.01)
    *G06F 12/0891*     (2016.01)

(56) References Cited

U.S. PATENT DOCUMENTS

| | | | |
|---|---|---|---|
| 9,720,835 B1 * | 8/2017 | Shilane | G06F 12/127 |
| 2006/0184745 A1 * | 8/2006 | Tan | G06F 12/0804 |
| | | | 711/143 |
| 2011/0289257 A1 * | 11/2011 | Hathaway | G06F 12/12 |
| | | | 711/3 |
| 2012/0054421 A1 | 3/2012 | Hiratsuka et al. | |
| 2015/0113212 A1 | 4/2015 | Hiratsuka et al. | |
| 2016/0085446 A1 | 3/2016 | Kumabe et al. | |

FOREIGN PATENT DOCUMENTS

| | | |
|---|---|---|
| JP | 2012-048361 A | 3/2012 |
| JP | 2013-174997 A | 9/2013 |
| JP | 2016-062315 A | 4/2016 |
| KR | 10-2012-0024429 A | 3/2012 |

\* cited by examiner

FIG. 6

| | SETTING VALUE | OPERATION CONTENT |
|---|---|---|
| CACHE HIT ADDITION VALUE | 4 | VALUE TO BE ADDED TO ACCESS FREQUENCY WHEN THERE IS HIT IN CACHE STORAGE OR CANDIDATE CACHE |
| CACHE MISS SUBTRACTION VALUE | 1 | VALUE TO BE SUBTRACTED FROM ACCESS FREQUENCY WHEN THERE IS MISS IN CACHE STORAGE OR CANDIDATE CACHE |
| CANDIDATE CACHE INITIAL VALUE | 32 | INITIAL VALUE TO BE SET TO ACCESS FREQUENCY IN REGISTRATION TO EMPTY CANDIDATE CACHE OR CANDIDATE CACHE TO BE DELETED |

FIG.7

| | THRESHOLD | CHANGE | OPERATION CONTENT |
|---|---|---|---|
| CACHE-IN THRESHOLD | 40 | ↑ | REGISTER CANDIDATE CACHE TO EMPTY CACHE ENTRY OR CACHE ENTRY TO BE DELETED (LOAD DATA ON CACHE STORAGE) |
| CANDIDATE CACHE-OUT THRESHOLD | 16 | ↓ | DELETE CANDIDATE ENTRY FROM CANDIDATE CACHE (ONLY ADDRESS) |
| WRITE BACK START THRESHOLD | 16 | ↓ | WRITE BACK DIRTY CACHE ENTRY (COPY DATA TO MAIN STORAGE) |
| CACHE-OUT THRESHOLD | 8 | ↓ | DELETE CACHE ENTRY FROM CACHE STORAGE (DELETE ADDRESS AND DATA) |

STORAGE CONTROL DEVICE FOR CONTROLLING CACHE MEMORY BASED ON ACCESS FREQUENCIES

CROSS REFERENCE TO RELATED APPLICATIONS

This application is a U.S. National Phase of International Patent Application No. PCT/JP2019/016105 filed on Apr. 15, 2019, which claims priority benefit of Japanese Patent Application No. JP 2018-140104 filed in the Japan Patent Office on Jul. 26, 2018. Each of the above-referenced applications is hereby incorporated herein by reference in its entirety.

TECHNICAL FIELD

The present technology relates to a storage control device. Specifically, the present technology relates to a storage control device configured to control a cache storage, and a storage device and an information processing system that include the storage control device.

BACKGROUND ART

As a method of managing cache entries in a cache memory (cache storage), the LRU (Least Recently Used) scheme that determines, as a replacement target, a cache entry that has not been used for the longest amount of time has been known. In the LRU scheme, only the latest use order of a cache memory is taken into consideration, and hence, there is a possibility that even data with a high access frequency is determined as a replacement target. Thus, a method of controlling a cache memory by taking access frequencies into consideration has been proposed. For example, there has been proposed a cache memory control device configured to perform, in a case where there is a certain way continuously accessed, control of setting the access frequency bit of the way and replacing ways other than the way (for example, see PTL 1).

CITATION LIST

Patent Literature

[PTL 1]
   Japanese Patent Laid-open No. 2000-047942

SUMMARY

Technical Problems

In the above-mentioned related art, data to be left in a cache memory is determined, and most recently accessed data is selected as data to be newly registered to the cache memory. However, whether or not the newly registered data leads to a cache hit is unknown. If data not expected to lead to a cache hit is registered to the cache memory, a complicated data transfer is performed between a memory and the cache memory. Then, this may prevent a host computer from accessing the cache memory, resulting in low access. Further, in a case where a non-volatile memory, which has an upper limit in number of writes, is used as the cache memory, if the complicated data transfer is repeated, there is a possibility that the number of writes is increased and the life is shortened.

The present technology has been made in view of such circumstances and has an object to check the access frequency of data to be registered to a cache storage and register only data with a high access frequency to the cache storage.

Solution to Problems

The present technology has been made in order to solve the above-mentioned problems, and according to a first aspect thereof, there are provided a storage control device, a storage device, and an information processing system that include a cache management unit configured to hold an access frequency for each cache entry in a cache storage configured to store part of data stored in a main storage, a candidate cache management unit configured to hold the access frequency for each candidate entry not registered to the cache storage, and a cache update unit configured to update the access frequency according to an address of an issued access command and update the cache entry and the candidate entry based on the access frequency. This provides an action of updating cache entries in the cache storage and candidate entries in the candidate cache on the basis of their access frequencies.

Further, in the first aspect, in a case where the address of the issued access command has been registered to neither the cache entry nor the candidate entry, the cache update unit may register the address to the candidate entry and set an initial value to the access frequency of the candidate entry. This provides an action of registering, in the case where the address of the access command has not been registered, the address to a candidate entry first.

Further, in the first aspect, when the access frequency of the candidate entry exceeds a predetermined cache-in threshold, the cache update unit may register the candidate entry to the cache storage as the cache entry and store relevant data in the main storage to the cache storage. This provides an action of storing, when the access frequency of data exceeds the cache-in threshold, the data in the cache storage.

Further, in this case, when the cache update unit registers the candidate entry with the access frequency higher than the cache-in threshold to the cache storage as the cache entry, the cache update unit may delete the candidate entry that is an original entry.

Further, in the first aspect, when the access frequency of the cache entry falls below a predetermined cache-out threshold, the cache update unit may set the cache entry as a deletion candidate from the cache storage. This provides an action of setting, when the access frequency of a cache entry falls below the cache-out threshold, the cache entry as an entry to be deleted from the cache storage.

Further, in the first aspect, when the access frequency of the cache entry falls below a predetermined write back start threshold and data on the cache entry in the cache storage does not match the main storage, the cache update unit may transfer the data from the cache storage to the main storage. This provides an action of writing back, when a cache entry falls below the write back start threshold before being deleted from the cache storage, the cache entry to the cache storage.

Further, in the first aspect, when the access frequency of the candidate entry falls below a predetermined candidate cache-out threshold, the cache update unit may set the candidate entry as a deletion candidate. This provides an action of setting, when the access frequency of a candidate entry falls below the predetermined candidate cache-out threshold, the candidate entry as an entry to be deleted from the candidate cache.

Further, in the first aspect, in a case where the address of the issued access command has been registered to either the cache entry or the candidate entry, the cache update unit may increase a value of the access frequency of the entry to which the address has been registered and decrease a value of the access frequency of the other entry. This provides an action of updating access frequency values depending on cache hits in the cache storage or the candidate cache.

Further, in the first aspect, the cache storage may include a non-volatile memory having an upper limit in number of writes. In this case, there is provided an action of selectively registering data expected to lead to a cache hit in the cache storage to reduce the number of writes, thereby extending the life.

Advantageous Effect of Invention

According to the present technology, an excellent effect that only data with a high access frequency can be registered to the cache storage may be provided. Note that the effect described here is not necessarily limited and may be any effect described in the present disclosure.

BRIEF DESCRIPTION OF DRAWINGS

FIG. 6 is a diagram illustrating an example of setting values of a cache replacement algorithm according to the embodiment of the present technology.

FIG. 7 is a diagram illustrating an example of thresholds of the cache replacement algorithm according to the embodiment of the present technology.

DESCRIPTION OF EMBODIMENT

Now, a mode for carrying out the present technology (hereinafter referred as an "embodiment") is described. The following items are described in order.
1. Hardware Configuration
2. Cache Replacement Algorithm
3. Operation
<1. Hardware Configuration>
[Information Processing System]

Figure 1:
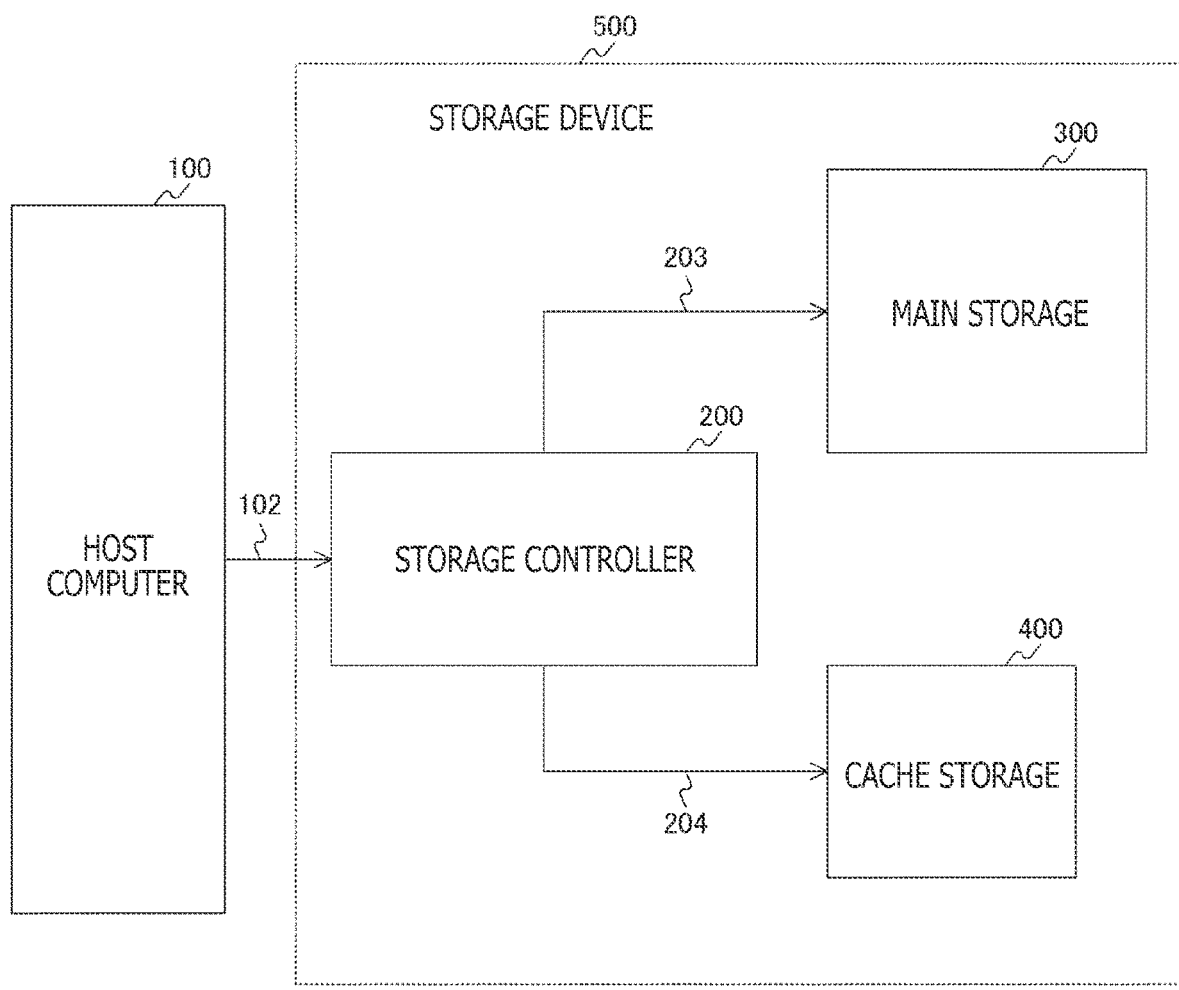
FIG. 1 is a diagram illustrating an example of the entire configuration of an information processing system according to an embodiment of the present technology.

FIG. 1 is a diagram illustrating an example of the entire configuration of an information processing system according to the embodiment of the present technology. The information processing system includes a host computer 100, a storage controller 200, a main storage 300, and a cache storage 400. The storage controller 200, the main storage 300, and the cache storage 400 are components of a storage device 500.

The host computer 100 issues, to the storage system, commands for requesting data read processing, data write processing, or the like. The host computer 100 has a function of transmitting a command giving an instruction on the operation of the storage controller 200 and an address indicating an operation target of the command, to the storage controller 200 through a signal line 102. Further, the host computer 100 has a function of transmitting/receiving data to/from the storage controller through a signal line, which is not illustrated.

The storage controller 200 communicates with the host computer 100 to receive commands and requests read processing or write processing with respect to the main storage 300 or the cache storage 400. The storage controller 200 transmits a request giving an instruction on the operation of the main storage 300 and an address indicating an operation target of the request, to the main storage 300 through a signal line 203. Further, the storage controller 200 transmits a request giving an instruction on the operation of the cache storage 400 and an address indicating an operation target of the request, to the cache storage 400 through a signal line 204. Further, the storage controller 200 transmits/receives data to/from the main storage 300 or the cache storage 400 through a signal line, which is not illustrated.

The main storage 300 is a storage configured to store entire data in the storage device 500. The main storage 300 is a storage device having a larger capacity than the cache storage 400 and a lower response speed than the cache storage 400. The main storage 300 is assumed as, for example, a hard disk or a non-volatile memory such as a NAND flash memory. The main storage 300 reads or writes data according to a request received from the storage controller 200 through the signal line 203.

The cache storage 400 is a storage configured to hold data with a high access frequency. The cache storage 400 is a storage device having a smaller capacity than the main storage 300 and a higher response speed than the main storage 300, and operates as the cache of the main storage 300. That is, the cache storage 400 stores part of the data in the main storage 300. The cache storage 400 is assumed as, for example, a high-speed non-volatile memory such as a resistive random access memory. A non-volatile memory has an upper limit in number of writes in many cases. However, according to the embodiment, data expected to lead to a cache hit is selectively registered to the cache storage 400, and the number of writes in the cache storage 400 is reduced, so that the life can be extended. The cache storage 400 reads or writes data according to a request received from the storage controller 200 through the signal line 204.

In such a system configuration, before data is registered to the cache storage 400, the access frequency is checked, and only data with a high access frequency is registered to the cache storage 400. To achieve this, a candidate cache is introduced to measure access frequencies. The candidate cache stores, without storing data, candidate entries storing address information and access frequencies.

[Storage Controller]

Figure 2:
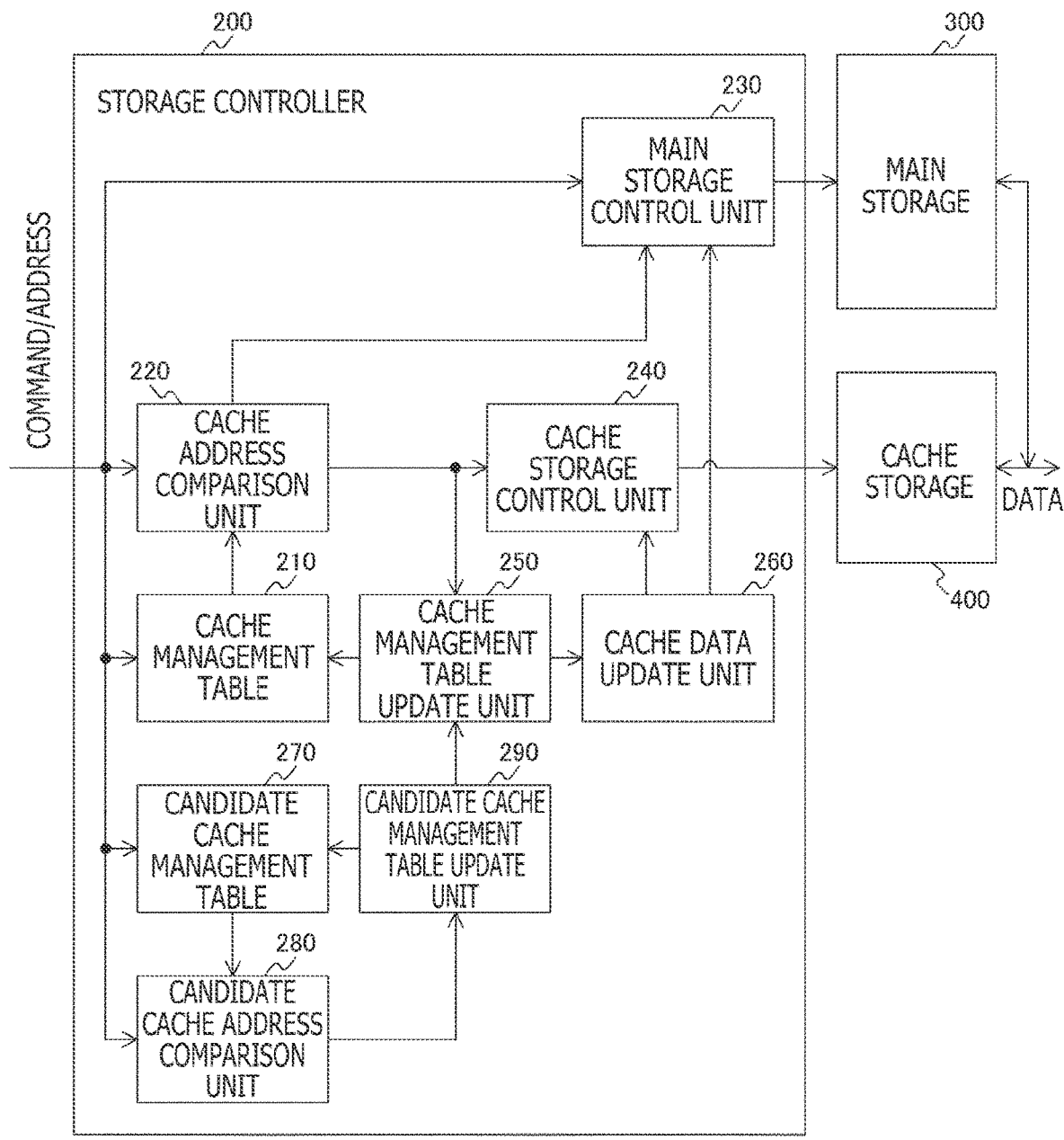
FIG. 2 is a diagram illustrating an example of the configuration of a storage controller 200 according to the embodiment of the present technology.

FIG. 2 is a diagram illustrating an example of the configuration of the storage controller 200 according to the embodiment of the present technology.

The storage controller 200 includes a cache management table 210, a cache address comparison unit 220, a main storage control unit 230, a cache storage control unit 240, a cache management table update unit 250, a cache data update unit 260, a candidate cache management table 270, a candidate cache address comparison unit 280, and a candidate cache management table update unit 290.

The cache management table 210 is a table that holds cache entries for managing the cache storage 400. Note that the cache management table 210 is an example of a cache management unit described in scope of claims.

The cache address comparison unit 220 compares an address specified by the host computer 100 to the addresses of cache entries in the cache management table 210, thereby determining a cache hit or miss.

In a case where there is a cache miss as a result of a determination by the cache address comparison unit 220, the main storage control unit 230 makes an access to the main storage 300 on the basis of the address specified by the host computer 100.

The cache management table update unit 250 updates cache management information regarding a relevant set on the cache management table 210, on the basis of the result of a determination by the cache address comparison unit 220.

The cache storage control unit 240 makes an access to the cache storage 400 for data on the basis of a cache address output from the cache management table update unit 250.

The cache data update unit 260 transfers data between the main storage 300 and the cache storage 400 on the basis of an instruction from the cache management table update unit 250.

The candidate cache management table 270 is a table that holds candidate entries in the candidate cache that have not been registered to the cache storage 400 yet. Note that the candidate cache management table 270 is an example of a candidate cache management unit described in scope of claims.

The candidate cache address comparison unit 280 compares an address specified by the host computer 100 to addresses registered to candidate cache management information (candidate entries) in the candidate cache management table 270, thereby determining whether or not the address has been registered to the candidate cache.

The candidate cache management table update unit 290 updates, on the basis of the result of a determination by the candidate cache address comparison unit 280, candidate cache management information regarding a relative set on the candidate cache management table 270. The candidate cache management table update unit 290 refers to the access frequency of a candidate entry held in the candidate cache management information, thereby determining whether or not to register the candidate entry to the cache management table 210. The cache management table update unit 250 registers new address information to the cache management table 210 on the basis of the result of a determination by the candidate cache management table update unit 290.

Note that the cache management table update unit 250, the candidate cache management table update unit 290, and the cache data update unit 260 correspond to an example of a cache update unit described in scope of claims.

Figure 3:
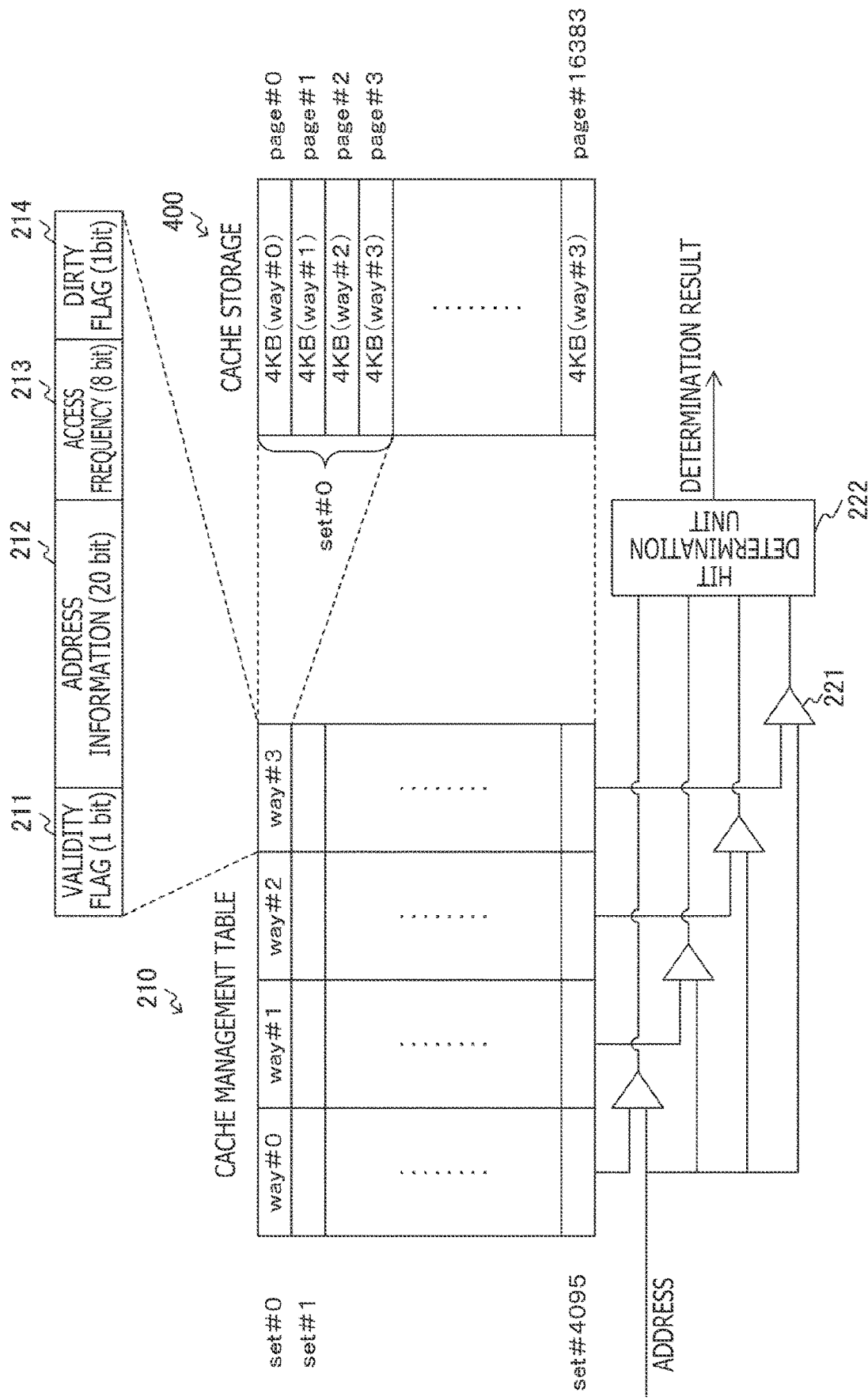
FIG. 3 is a diagram illustrating an example of the configurations of a cache management table 210 and a cache address comparison unit 220 according to the embodiment of the present technology.

FIG. 3 is a diagram illustrating an example of the configurations of the cache management table 210 and the cache address comparison unit 220 according to the embodiment of the present technology.

In this example, the cache storage 400 is assumed as a 4-way set associative memory. Further, the cache storage 400 has a total capacity of 64 MB and is managed with 4 KB pages. An access is made to the cache storage 400 with an address having a set address as a part thereof. In this example, each set holds at most four cache entries. That is, there are four ways per set. The cache storage 400 thus has 4,096 sets in total.

When the main storage 300 is assumed to have a total capacity of 8 GB and is managed with 4,096 sets, there are 2,048 pages per set. That is, at most four pages of the 2,048 pages are held in the cache storage 400.

Cache management information regarding cache entries stored in corresponding ways of the cache management table 210 includes, for example, a validity flag 211 of 1 bit, address information 212 of 20 bits, access frequency information 213 of 8 bits, and a dirty flag 214 of 1 bit.

The validity flag 211 is a flag indicating whether or not a cache entry is valid. For example, the validity flag 211 indicating "1" means that a cache entry is "valid," and the validity flag 211 indicating "0" means that a cache entry is "invalid."

The address information 212 holds an address part (associative address) corresponding to a cache entry. The address information 212 is referred to by the cache address comparison unit 220 to be compared to the address part of an address specified by the host computer 100.

The access frequency information 213 holds a value indicating the access frequency of a cache entry. In cache entry replacement, this value is referred to. For example, in a case where the value of the access frequency information 213 regarding a cache entry falls below a cache-out threshold, the cache entry is set as a deletion candidate to be deleted from the cache management table 210.

The dirty flag 214 is a flag indicating whether or not data on a cache entry matches the main storage 300. For example, the dirty flag 214 indicating "1" means a mismatch (dirty), and the dirty flag 214 indicating "0" means a match. To keep the consistency (coherency) between the main storage 300 and the cache storage 400, it is necessary to write back data on mismatch cache entries from the cache storage 400 to the main storage 300. The timing of this write back is described later.

The cache address comparison unit 220 includes four comparators 221 and a hit determination unit 222. The comparators 221 compare the four pieces of address information 212, which have been read from the cache management table 210 on the basis of the set address of an address specified by the host computer 100, to an associative address that is a part of the address specified by the host computer 100. When any of the four comparators 221 detects a match, the hit determination unit 222 outputs a determination result indicating that there is a cache hit. Meanwhile, in a case where none of the four comparators 221 detects a match, the hit determination unit 222 outputs a determination result indicating that there is a cache miss. The determination result is supplied to the cache storage control unit 240 and the cache management table update unit 250. Note that the cache address comparison unit 220 makes a comparison only with cache entries with the validity flag 211 indicating "valid," and even when an address matches a cache entry with the validity flag 211 indicating "invalid," it is not determined that there is a cache hit.

Figure 4:
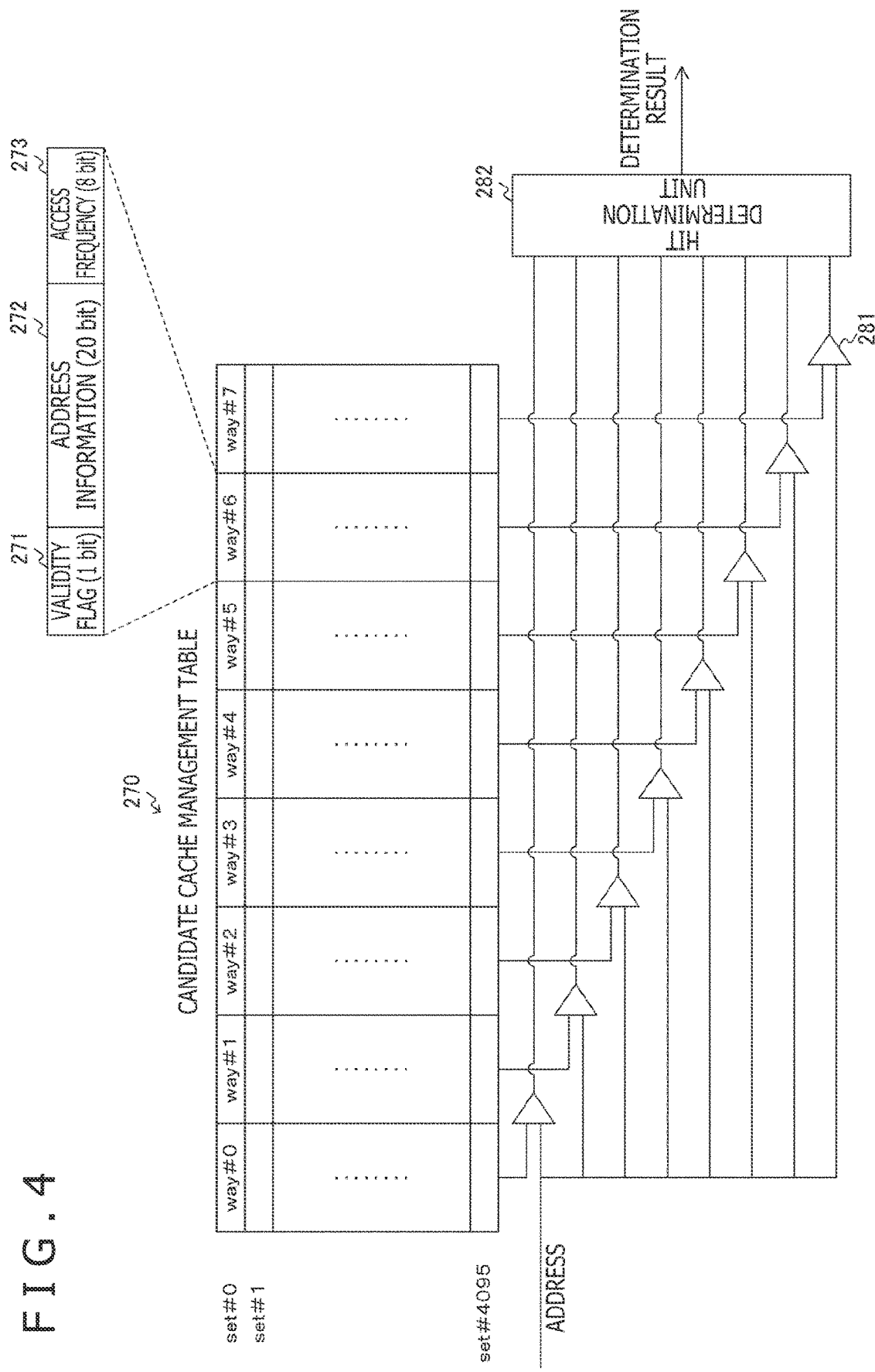
FIG. 4 is a diagram illustrating an example of the configurations of a candidate cache management table 270 and a candidate cache address comparison unit 280 according to the embodiment of the present technology.

FIG. 4 is a diagram illustrating an example of the configurations of the candidate cache management table 270 and the candidate cache address comparison unit 280 according to the embodiment of the present technology.

In this example, the candidate cache is assumed as an 8-way set associative memory. Since the candidate cache is for monitoring access frequencies, the candidate cache does not need a data storage area. The candidate cache management table 270 holds eight pieces of candidate cache management information (candidate entries) per set.

Candidate cache management information regarding candidate entries stored in corresponding ways of the candidate cache management table 270 includes, for example, a validity flag 271 of 1 bit, address information 272 of 20 bits, and access frequency information 273 of 8 bits. These pieces of information are similar to the cache management information in the cache management table 210 described above. These pieces of information include, however, no dirty flag since there is no data storage area.

The candidate cache address comparison unit 280 includes eight comparators 281 and a hit determination unit 282. These units are similar to those of the cache address comparison unit 220 described above. When any of the eight comparators 281 detects a match, the hit determination unit 282 outputs a determination result indicating that an address has been registered to the candidate cache. Meanwhile, in a case where none of the eight comparators 281 detects a match, the hit determination unit 282 outputs a determination result indicating that an address has not been registered to the candidate cache.

In a case where there is an address not registered to the candidate cache, the address is newly registered to a candidate entry in a relevant set in the candidate cache management table 270. At this time, a candidate entry with the validity flag 271 indicating "invalid" or a candidate entry to be deleted is used.

Further, in a case where the access frequency information 273 regarding a candidate entry registered to the candidate cache exceeds a cache-in threshold, the candidate entry is newly registered to a cache entry of the cache management table 210. At this time, a cache entry with the validity flag 211 indicating "invalid" or a cache entry to be deleted is used. Further, the entry registered to the cache management table 210 as the cache entry is deleted from the candidate cache. That is, the validity flag 271 is set to "invalid."

Meanwhile, in a case where the access frequency information 273 regarding a candidate entry registered to the candidate cache exceeds a candidate cache-out threshold, the candidate entry is not registered to the cache management table 210 and set as a deletion candidate to be deleted from the candidate cache management table 270.

<2. Cache Replacement Algorithm>
[Access Frequency Information]

Figure 5:
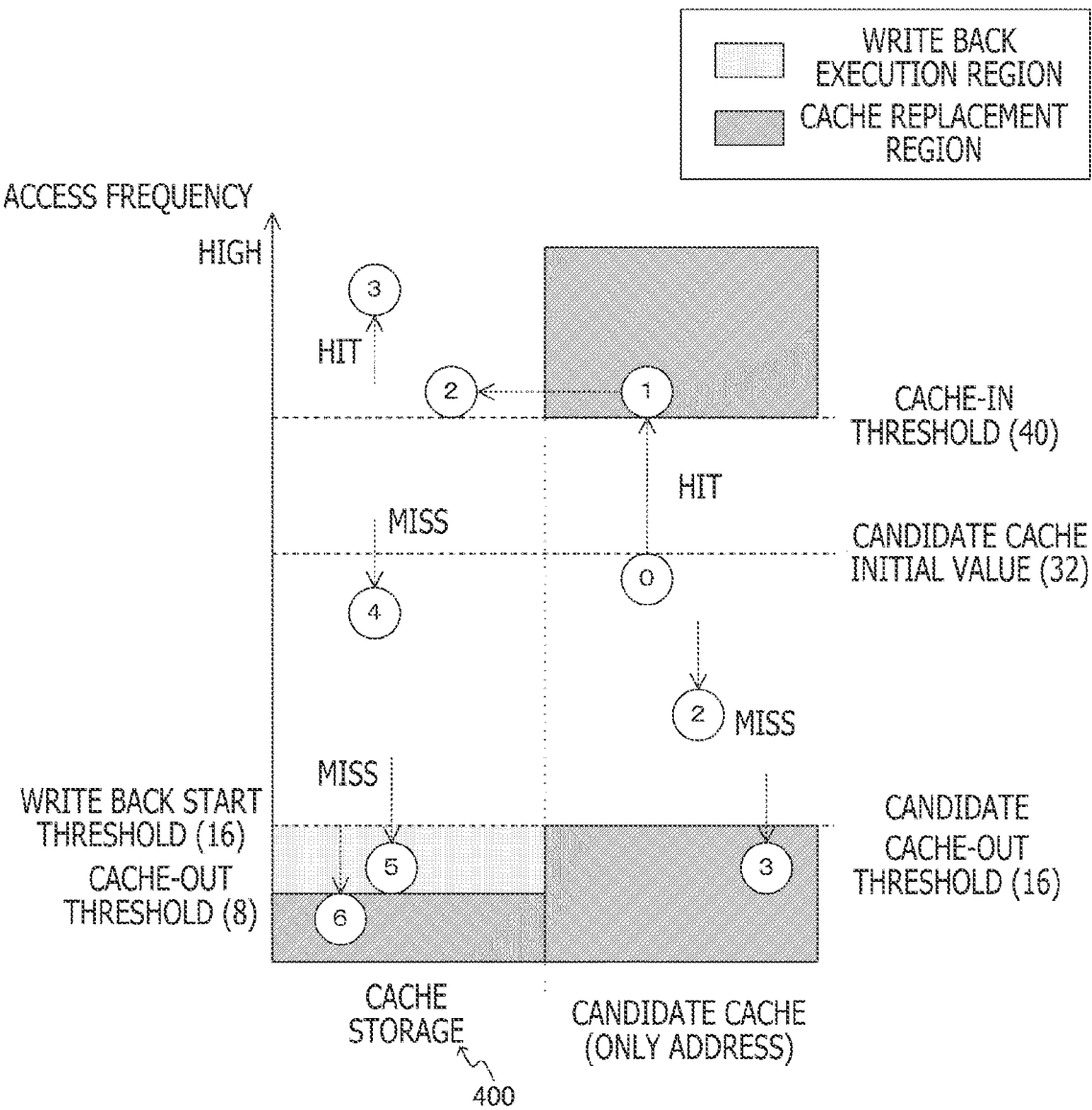
FIG. 5 is a diagram illustrating an example of a relation between a cache storage 400, a candidate cache, and an access frequency according to the embodiment of the present technology.

FIG. 5 is a diagram illustrating an example of relation between the cache storage 400, the candidate cache, and an access frequency according to the embodiment of the present technology. FIG. 6 is a diagram illustrating an example of setting values of a cache replacement algorithm according to the embodiment of the present technology. FIG. 7 is a diagram illustrating an example of thresholds of the cache replacement algorithm according to the embodiment of the present technology.

In the embodiment, an address specified by a command issued from the host computer 100 is not directly registered to the cache storage 400, but the access frequency is monitored. To achieve this, the address is first registered to the candidate cache management table 270 of the candidate cache. At this time, as the initial value of the access frequency information 273, a candidate cache initial value of "32" is set, for example.

After the registration to the candidate cache management table 270, every time an access matching the candidate entry is made, the value of the access frequency information 273 is increased. For example, a cache hit addition value of "4" is added. Meanwhile, every time an access not matching the candidate entry is made, the value of the access frequency information 273 is decreased. For example, a cache miss subtraction value of "1" is subtracted.

When the value of the access frequency information 273 is increased to exceed the cache-in threshold as a result, the candidate entry is registered to the cache management table 210 as a cache entry. In this case, the candidate entry is deleted from the candidate cache management table 270. The value of the access frequency information 273 is taken over as the access frequency information 213 as it is. Note that this cache-in threshold is, for example, "40."

Meanwhile, when the value of the access frequency information 273 is decreased to fall below the candidate cache-out threshold, the candidate entry is set as a deletion candidate to be deleted from the candidate cache management table 270. The candidate entry may be quickly deleted from the candidate cache management table 270, but it is not problem that the candidate entry remains valid unless there is no other entry to be registered. Note that this candidate cache-out threshold is, for example, "16."

Even after the registration to the cache management table 210, the value of the access frequency information 213 is increased every time there is an access matching the cache entry. For example, "4" is added. Meanwhile, every time there is an access not matching the cache entry, the value of the access frequency information 213 is decreased. For example, "1" is subtracted.

When the value of the access frequency information 213 is decreased to fall below the cache-out threshold as a result, the candidate entry is set as a deletion candidate to be deleted from the cache management table 210. The cache entry may be quickly deleted from the cache management table 210, but it is not problem that the cache entry remains valid unless there is no other entry to be registered. Note that this cache-out threshold is, for example, "8."

Further, at a timing at which the cache entry falls below a write back start threshold before falling below the cache-out threshold, data on the mismatch cache entry is written back from the cache storage 400 to the main storage 300. With this, a preparation for deletion from the cache management table 210 can be made in advance. Note that this write back start threshold is, for example, "16."

In this way, an entry is replaced between the cache storage 400 and the candidate cache depending on its access frequency.

[Setting Value]

Here, the above-mentioned setting values are considered. When the hit rate of the cache storage 400 is assumed as 80%, in the 4-way set associative memory, the average number of hits per way of 40 accesses is eight. That is, 40 accesses lead to eight cache hits and 32 cache misses. In this case, while an initial value in a registration to the candidate cache is set to "32" and "1" is subtracted every time there is a miss, a cache hit addition value N is set to $$N=32/8=4$$

and therefore, an expected balance can be obtained.

Note that, needless to say, the numerical examples of the setting values and thresholds described in the embodiment are merely examples, and suitable values may be used as appropriate. Further, in the numerical examples, a large access frequency information value is set in the case where an access frequency is high. In contrast, however, in a case where an access frequency is low, a large access frequency information value may be set. However, in this case, the magnitude relations in regard to the thresholds are also reversed.

[Access Frequency Information]

In the embodiment, the access frequency information is newly held. When the access frequency information is assumed to occupy a capacity of 8 bits (1 byte) as described above, the cache management table 210 has four ways per set, and the candidate cache management table 270 has eight ways per set, and thus, total amount of access frequency information=4,096×(4+8)=48 K bytes
is given. This is considered as a relatively small value as the data amount of an entire cache.

<3. Operation>

[Access Operation]

Figure 8:
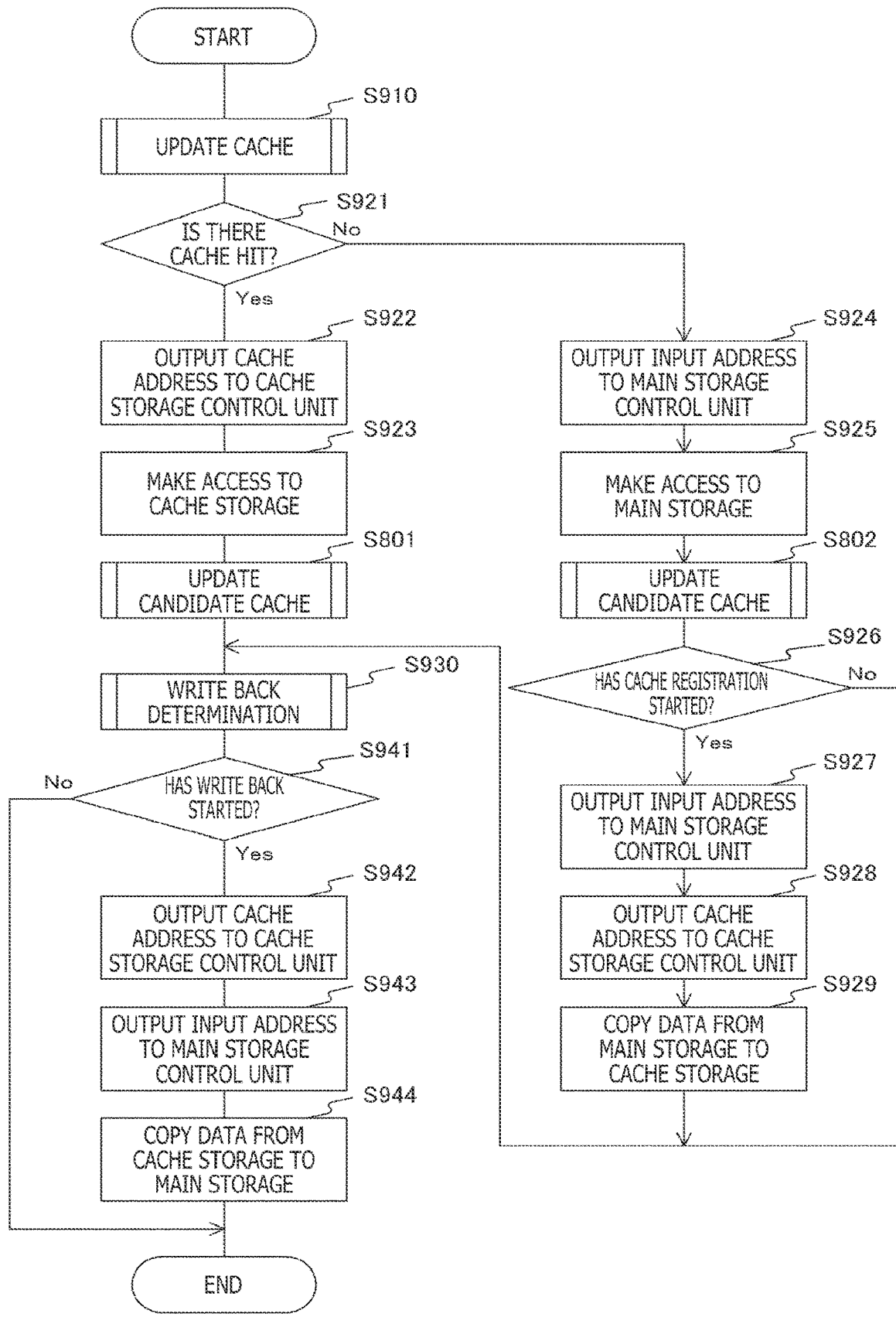
FIG. 8 is a flow chart illustrating a processing procedure example of access operation by the storage controller 200 according to the embodiment of the present technology.

FIG. 8 is a flow chart illustrating a processing procedure example of access operation by the storage controller 200 according to the embodiment of the present technology.

When a memory access command is issued from the host computer 100, the cache management table 210 is referred to in the storage controller 200, and cache update processing is performed by the cache management table update unit 250 (Step S910). In a case where there is a cache hit (Step S921: Yes), the cache address is output to the cache storage control unit 240 (Step S922). With this, an access is made to the cache storage 400 (Step S923). Then, the candidate cache is also subjected to update processing (Step S801).

Meanwhile, in a case where there is a cache miss (Step S921: No), the input address is output to the main storage control unit 230 (Step S924). With this, an access is made to the main storage 300 (Step S925). Then, the candidate cache is also subjected to update processing (Step S802). In a case where a registration from the candidate cache to the cache storage 400 has started as a result (Step S926: Yes), data copy processing is performed as follows. That is, the input address is output to the main storage control unit 230 (Step S927), and the cache address is output to the cache storage control unit 240 (Step S928). Then, the data is copied from the main storage 300 to the cache storage 400 (Step S929).

After that, it is determined whether or not to perform write back in the cache storage 400 (Step S930). In a case where write back has started as a result (Step S941: Yes), the following write back processing is performed. That is, the cache address is output to the cache storage control unit 240 (Step S942), and the input address is output to the main storage control unit 230 (Step S943). Then, the data is copied from the cache storage 400 to the main storage 300 (Step S944).

[Cache Update]

Figure 9:
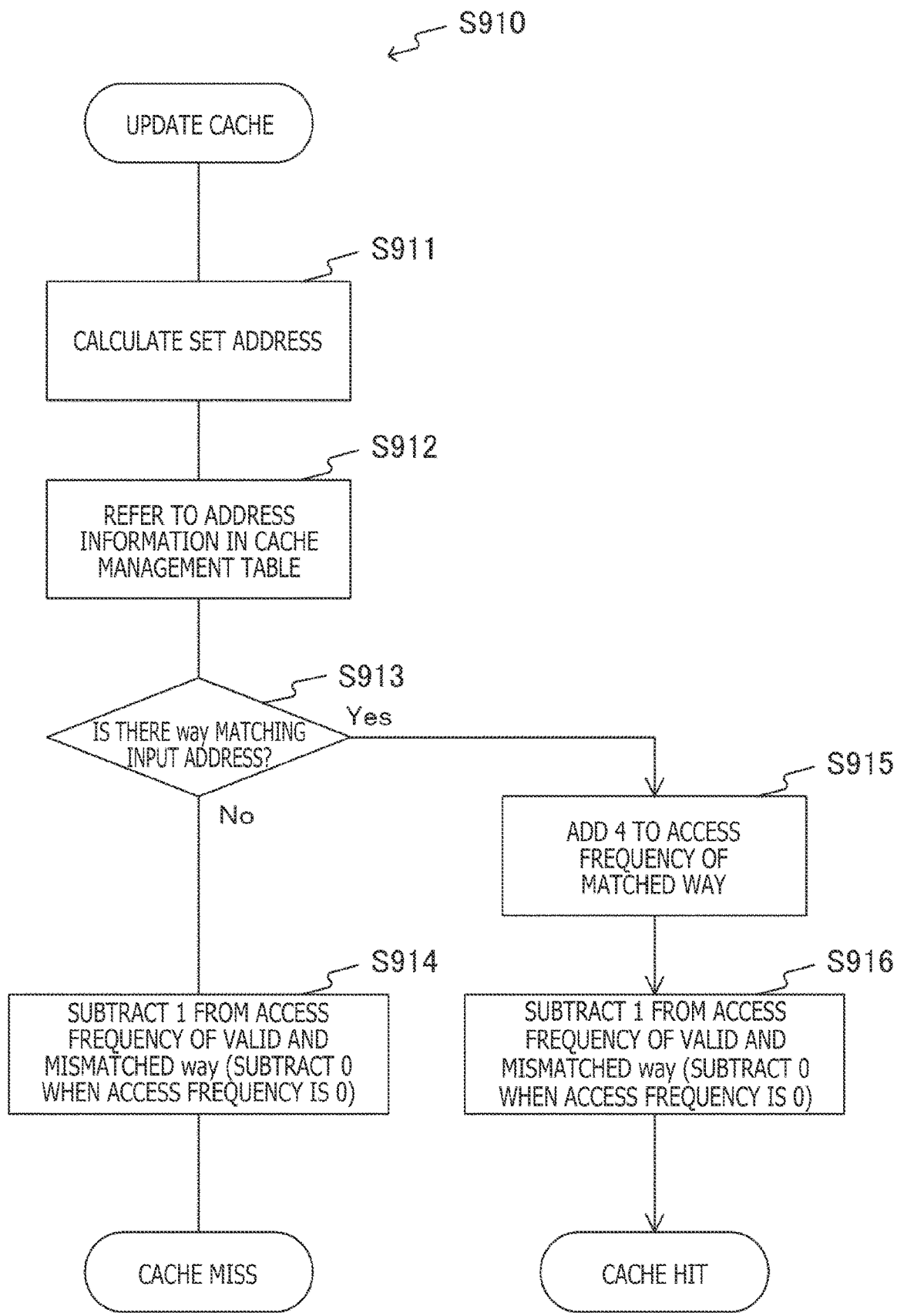
FIG. 9 is a flow chart illustrating a processing procedure example of cache update processing by a cache management table update unit 250 according to the embodiment of the present technology.

FIG. 9 is a flow chart illustrating a processing procedure example of the cache update processing (Step S910) by the cache management table update unit 250 according to the embodiment of the present technology.

First, a set address is calculated from the address issued from the host computer 100 (Step S911). Then, with the set address, the cache management information in the cache management table 210 is referred to (Step S912). In this example, the cache storage 400 is assumed as a 4-way set associative memory, and hence, cache management information regarding four cache entries is acquired.

When the acquired four pieces of cache management information include a way matching the address issued from the host computer 100 (Step S913: Yes), "4" is added to the value of the access frequency information 213 regarding the matched way (Step S915). This "4" is an example of the cache hit addition value described above. Then, "1" is subtracted from the value of the access frequency information 213 regarding each of the three ways other than the matched way (Step S916). This "1" is an example of the cache miss subtraction value described above. Note that, when the access frequency information 213 has already been "0" at the time of subtraction, the subtraction is unnecessary. Further, with regard to cache management information with the validity flag 211 indicating "invalid," the update of the access frequency information 213 is unnecessary.

Meanwhile, when there is no way matching the address issued from the host computer 100 (Step S913: No), a cache miss subtraction value of "1" is subtracted from the value of the access frequency information 213 regarding each of the four pieces of cache management information (Step S914). Note that, when the access frequency information 213 has already been "0" at the time of subtraction, the subtraction is unnecessary. Further, with regard to cache management information with the validity flag 211 indicating "invalid," the update of the access frequency information 213 is unnecessary.

Note that, when there is a way matching the address issued from the host computer 100 (Step S913: Yes), it means that there is a cache hit, and when there is no way matching the address (Step S913: No), it means that there is a cache miss. Each result is supplied to the cache storage control unit 240 and the cache management table update unit 250.

[Write Back Determination]

Figure 10:
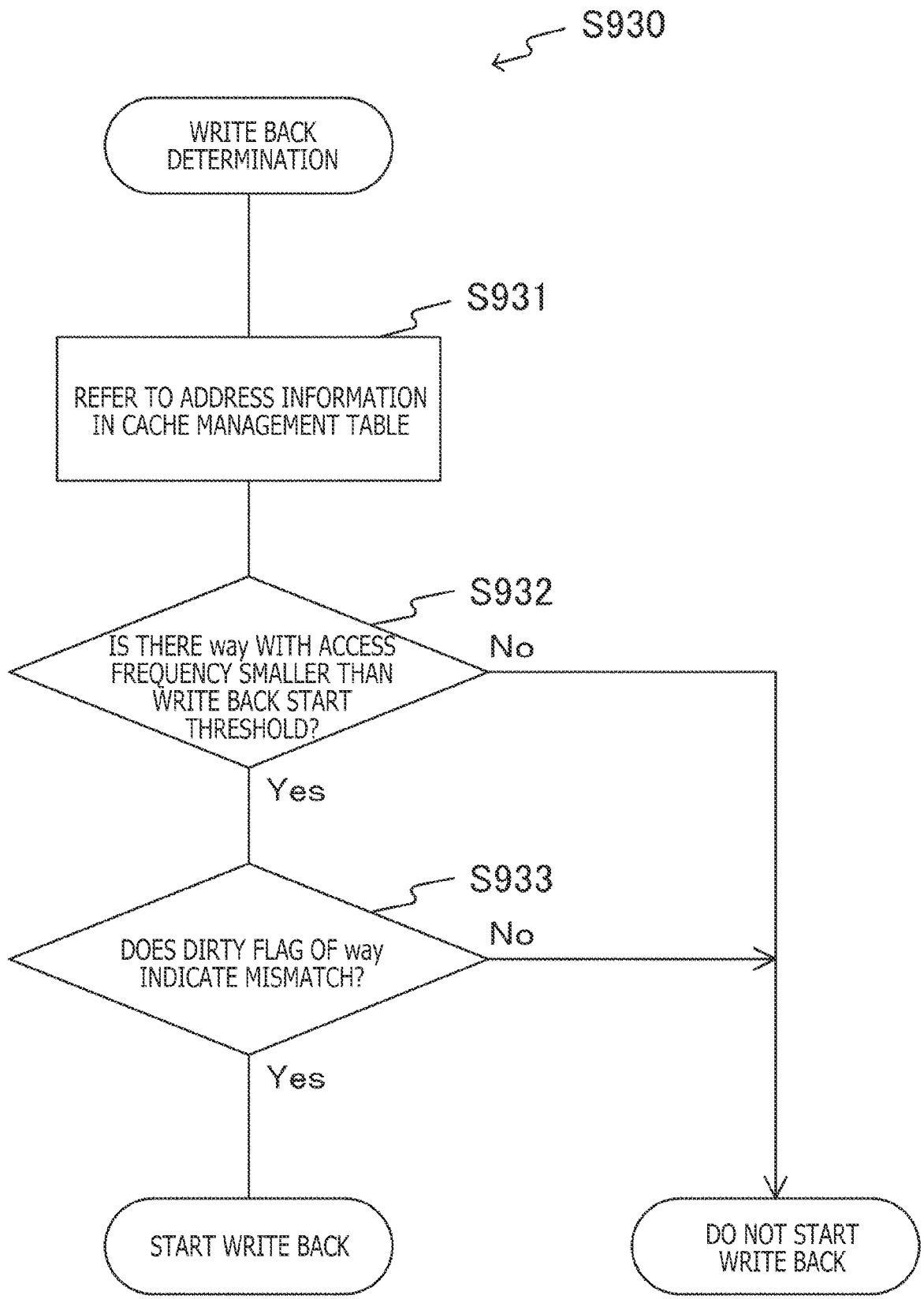
FIG. 10 is a flow chart illustrating a processing procedure example of write back determination processing by the cache management table update unit 250 according to the embodiment of the present technology.

FIG. 10 is a flow chart illustrating a processing procedure example of the write back determination processing (Step S930) by the cache management table update unit 250 according to the embodiment of the present technology.

In cache update, the cache management information in the cache management table 210 is referred to (Step S931). Then, it is determined whether or not the access frequency information 213 regarding the four pieces of cache management information includes a way falling below the write back start threshold (Step S932).

In a case where there is a way falling below the write back start threshold (Step S932: Yes) and the dirty flag 214 of the way indicates "mismatch" (dirty) (Step S933: Yes), it is determined that write back starts. Meanwhile, in a case where there is no way falling below the write back start threshold (Step S932: No) or in a case where there is a way falling below the write back start threshold but the dirty flag 214 of the way indicates "match" (Step S933: No), it is determined that write back does not start.

[Candidate Cache Update]

Figure 11:
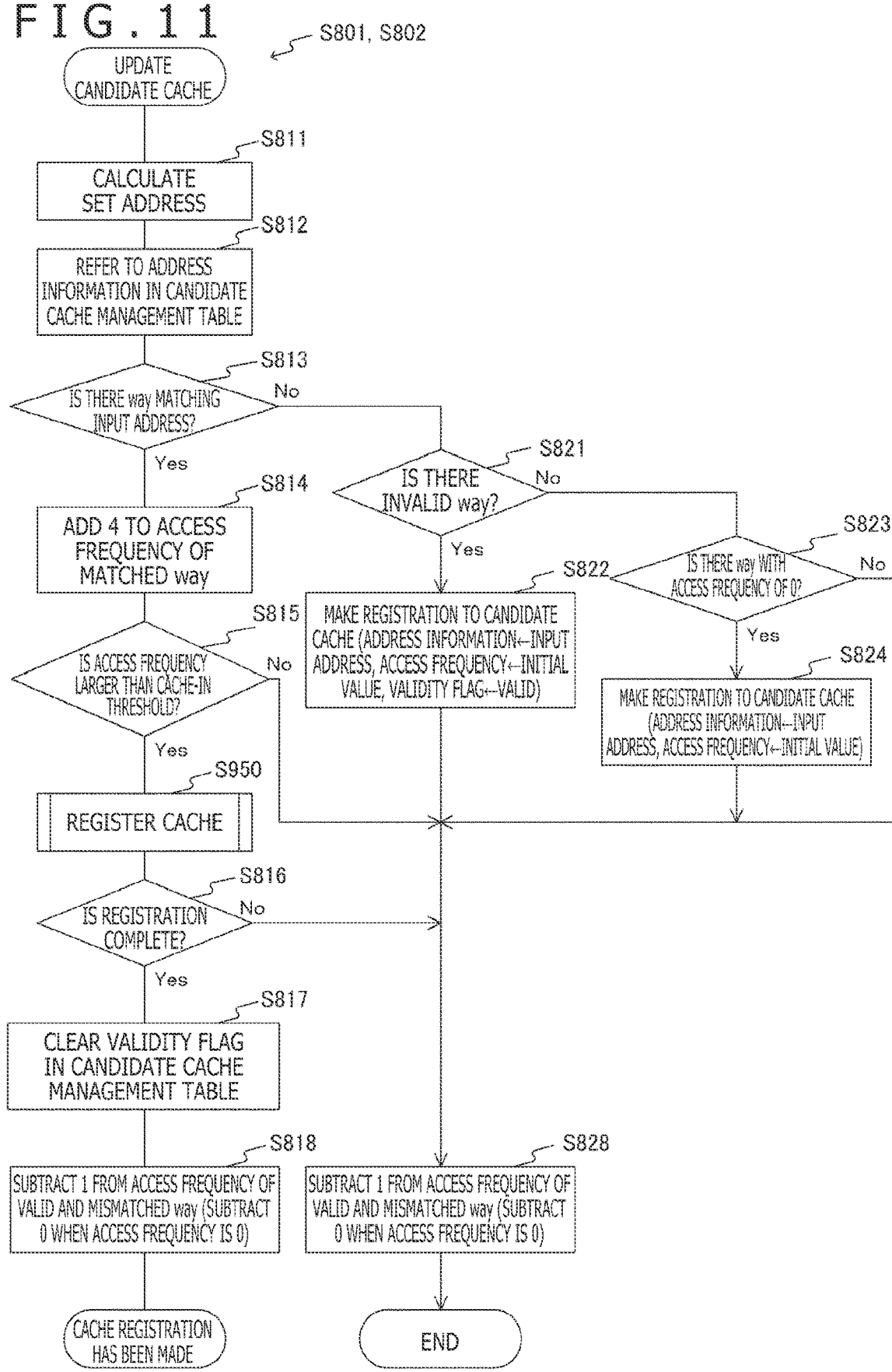
FIG. 11 is a flow chart illustrating a processing procedure example of candidate cache update processing by a candidate cache management table update unit 290 according to the embodiment of the present technology.

FIG. 11 is a flow chart illustrating a processing procedure example of the candidate cache update processing (Step S801 and Step S802) by the candidate cache management table update unit 290 according to the embodiment of the present technology.

First, a set address is calculated from the address issued from the host computer 100 (Step S811). Then, with the set address, the candidate cache management information in the candidate cache management table 270 is referred to (Step S812). In this example, the candidate cache is assumed as an 8-way set associative memory, and hence, candidate cache management information regarding eight candidate entries is acquired.

When the acquired eight pieces of candidate cache management information include a way matching the address issued from the host computer 100 (Step S813: Yes), a cache hit addition value of "4" is added to the value of the access frequency information 273 regarding the matched way (Step S814). When the value of the access frequency information 273 exceeds the cache-in threshold as a result (Step S815: Yes), the candidate entry is registered to the cache management table 210 (Step S950). When the registration to the cache management table 210 is complete (Step S816: Yes), the original candidate entry is deleted from the candidate cache management table 270 (Step S817). That is, the validity flag 271 is cleared to "invalid." Further, a cache miss subtraction value of "1" is subtracted from the value of the access frequency information 273 regarding each of the seven ways other than the matched way (Step S818). Note that, when the access frequency information 273 has already been "0" at the time of subtraction, the subtraction is unnecessary. Further, with regard to cache management information with the validity flag 271 indicating "invalid," the update of the access frequency information 273 is unnecessary.

Meanwhile, when there is no way matching the address issued from the host computer 100 (Step S813: No), a registration to the candidate cache is attempted. At this time, when the eight pieces of candidate cache management information include a way with the validity flag 271 indicating "invalid" (Step S821: Yes), a new registration is made to the way (Step S822). Here, in the candidate cache management information, the input address is set to the address information 272, a candidate cache initial value of, for example, "32" is set to the access frequency information 273, and "valid" is set to the validity flag 271.

In a case where the eight pieces of candidate cache management information include no way with the validity flag 271 indicating "invalid" (Step S821: No) but a way with the access frequency information 273 indicating "0" (Step S823: Yes), a new registration is made to the way (Step S824). At this time, in the candidate cache management information, the input address is set to the address information 272, and a candidate cache initial value of, for example, "32" is set to the access frequency information 273.

When the eight pieces of candidate cache management information include neither a way with the validity flag 271 indicating "invalid" (Step S821: No) nor a way with the access frequency information 273 indicating "0" (Step S823: No), a registration to the candidate cache is not made.

In the above, in the case where there is no way matching the address issued from the host computer 100 (Step S813: No), in the case where the value of the access frequency information 273 does not exceed the cache-in threshold (Step S815: No), and in the case where a cache registration is not compete (Step S816: No), a cache miss subtraction value of "1" is subtracted from the value of the access frequency information 273 regarding each way (Step S828). Note that, when the access frequency information 273 has already been "0" at the time of subtraction, the subtraction is unnecessary. Further, with regard to cache management information with the validity flag 271 indicating "invalid," the update of the access frequency information 273 is unnecessary.

[Cache Registration]

Figure 12:
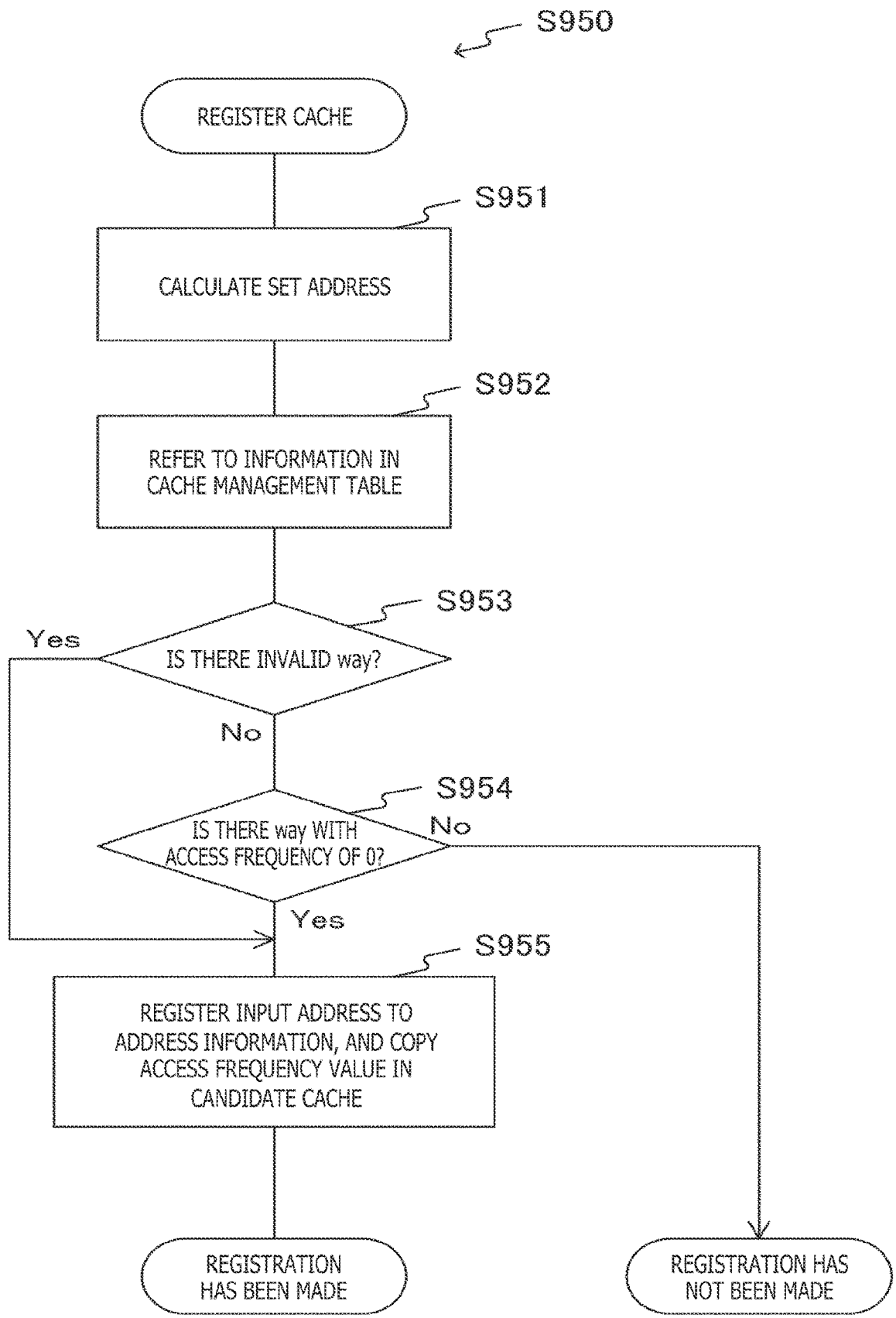
FIG. 12 is a flow chart illustrating a processing procedure example of cache registration processing by the cache management table update unit 250 according to the embodiment of the present technology.

FIG. 12 is a flow chart illustrating a processing procedure example of the cache registration processing (Step S950) by the cache management table update unit 250 according to the embodiment of the present technology.

First, a set address is calculated from the address issued from the host computer 100 (Step S951). Then, with the set address, the cache management information in the cache management table 210 is referred to (Step S952). In this example, the cache storage 400 is assumed as a 4-way set associative memory, and hence, cache management information regarding four cache entries is acquired.

When the acquired four pieces of cache management information include a way with the validity flag 211 indicating "invalid" (Step S953: Yes), a registration is made to the way (Step S955). At this time, the input address is set to the address information 212, and the value of the access frequency information 273 in the candidate cache is copied to the access frequency information 213.

In a case where there is no way with the validity flag 211 indicating "invalid" (Step S953: No) but there is a way with the access frequency information 213 indicating "0" (Step S954: Yes), a registration is made to the way (Step S955). When there is no way with the access frequency information 213 indicating "0" either (Step S954: No), a registration to the cache management table 210 is not made.

In this way, in the embodiment of the present technology, before data is registered to the cache storage 400, the access frequency is monitored with the use of the candidate cache management table 270, and the data is registered to the cache storage 400 when the access frequency exceeds the cache-in threshold. With this, only data expected to lead to a cache hit can be registered to the cache storage 400.

Note that the above-mentioned embodiment is only an example for implementing the present technology, and the matters in the embodiment have correspondence relationships with matters to define the invention in scope of claims. In a similar manner, the matters to define the invention in scope of claims have correspondence relationships with the matters in the embodiment of the present technology denoted by the same names. However, the present technology is not limited to the embodiment, and various modifications of the embodiment may be implemented without departing from the gist of the present technology.

Further, the processing procedures described in the above-mentioned embodiment may be regarded as a method including such series of procedures, as a program for causing a computer to execute such series of procedures, or as a recording medium configured to store the program. As the recording medium, for example, a CD (Compact Disc), an MD (Mini Disc), a DVD (Digital Versatile Disc), a memory card, or a Blu-ray (registered trademark) disc can be used.

Note that the effects described herein are merely examples and not limited, and other effects may be provided.

Note that the present technology can also take the following configurations.

(1)

A storage control device including:

a cache management unit configured to hold an access frequency for each cache entry in a cache storage configured to store part of data stored in a main storage;

a candidate cache management unit configured to hold the access frequency for each candidate entry not registered to the cache storage; and a cache update unit configured to update the access frequency according to an address of an issued access command and update the cache entry and the candidate entry based on the access frequency.

(2) The storage control device according to (1), in which in a case where the address of the issued access command has been registered to neither the cache entry nor the candidate entry, the cache update unit registers the address to the candidate entry and sets an initial value to the access frequency of the candidate entry.

(3) The storage control device according to (1) or (2), in which when the access frequency of the candidate entry exceeds a predetermined cache-in threshold, the cache update unit registers the candidate entry to the cache storage as the cache entry and stores relevant data in the main storage to the cache storage.

(4) The storage control device according to (3), in which when the cache update unit registers the candidate entry with the access frequency higher than the cache-in threshold to the cache storage as the cache entry, the cache update unit deletes the candidate entry that is an original entry.

(5) The storage control device according to any one of (1) to (4), in which when the access frequency of the cache entry falls below a predetermined cache-out threshold, the cache update unit sets the cache entry as a deletion candidate from the cache storage.

(6) The storage control device according to any one of (1) to (5), in which when the access frequency of the cache entry falls below a predetermined write back start threshold and data on the cache entry in the cache storage does not match the main storage, the cache update unit transfers the data from the cache storage to the main storage.

(7) The storage control device according to any one of (1) to (6), in which when the access frequency of the candidate entry falls below a predetermined candidate cache-out threshold, the cache update unit sets the candidate entry as a deletion candidate.

(8) The storage control device according to any one of (1) to (7), in which in a case where the address of the issued access command has been registered to either the cache entry or the candidate entry, the cache update unit increases a value of the access frequency of the entry to which the address has been registered and decreases a value of the access frequency of the other entry.

(9) A storage device including:

a main storage;

a cache storage configured to store part of data stored in the main storage;

a cache management unit configured to hold an access frequency for each cache entry in the cache storage;

a candidate cache management unit configured to hold the access frequency for each candidate entry not registered to the cache storage; and a cache update unit configured to update the access frequency according to an address of an issued access command and update the cache entry and the candidate entry based on the access frequency.

(10) The storage device according to (9), in which the cache storage includes a non-volatile memory having an upper limit in number of writes.

(11) An information processing system including:

a host computer;

a main storage;

a cache storage configured to store part of data stored in the main storage;

a cache management unit configured to hold an access frequency for each cache entry in the cache storage;

a candidate cache management unit configured to hold the access frequency for each candidate entry not registered to the cache storage; and a cache update unit configured to update the access frequency according to an address of an access command issued by the host computer and update the cache entry and the candidate entry based on the access frequency.

REFERENCE SIGNS LIST

100 Host computer
200 Storage controller
210 Cache management table
211 Validity flag
212 Address information
213 Access frequency information
214 Dirty flag
220 Cache address comparison unit
221 Comparator
222 Hit determination unit
230 Main storage control unit
240 Cache storage control unit
250 Cache management table update unit
260 Cache data update unit
270 Candidate cache management table
271 Validity flag
272 Address information
273 Access frequency information
280 Candidate cache address comparison unit
281 Comparator
282 Hit determination unit
290 Candidate cache management table update unit
300 Main storage
400 Cache storage
500 Storage device

The invention claimed is:

1. A storage control device, comprising:

a cache management unit configured to hold an access frequency for each cache entry of a plurality of cache entries in a cache storage, where the cache storage stores part of data stored in a main storage;

a candidate cache management unit configured to hold an access frequency for each candidate entry of a plurality of candidate entries not registered to the cache storage; and a cache update unit configured to:
  update the access frequency of one of a cache entry of the plurality of cache entries or a candidate entry of the plurality of candidate entries based on to an address of an issued access command;
  update the cache entry and the candidate entry based on the updated access frequency;
  register the candidate entry to the cache management unit as a new cache entry in a case where the access frequency of the candidate entry exceeds a cache-in threshold; and
  delete the candidate entry from the candidate cache management unit based on the registration of the candidate entry to the cache management unit.

2. The storage control device according to claim 1, wherein
in a case where the address of the issued access command is not registered to one of the cache entry or the candidate entry, the cache update unit is further configured to:
  register the address to the candidate entry; and
  set an initial value to the access frequency of the candidate entry.

3. The storage control device according to claim 1, wherein
in the case where the access frequency of the candidate entry exceeds the cache-in threshold the cache update unit is further configured to store data associated with the candidate entry from the main storage to the cache storage.

4. The storage control device according to claim 1, wherein
in a case where the access frequency of the cache entry falls below a cache-out threshold, the cache update unit is further configured to set the cache entry as a deletion candidate from the cache storage.

5. The storage control device according to claim 1, wherein
in a case where the access frequency of the cache entry falls below a write back start threshold and data on the cache entry in the cache storage does not match the main storage, the cache update unit is further configured to transfer the data from the cache storage to the main storage.

6. The storage control device according to claim 1, wherein
in a case where the access frequency of the candidate entry of the plurality of candidate entries falls below a candidate cache-out threshold, the cache update unit is further configured to set the candidate entry as a deletion candidate.

7. The storage control device according to claim 1, wherein
in a case where the address of the issued access command is registered to one of the cache entry or the candidate entry, the cache update unit is further configured to:
  increase a value of an access frequency of a corresponding entry among the cache entry and the candidate entry to which the address is registered; and
  decrease a value of an access frequency of the other entry among the cache entry and the candidate entry.

8. A storage device, comprising:
a main storage;
a cache storage configured to store part of data stored in the main storage;
a cache management unit configured to hold an access frequency for each cache entry of a plurality of cache entries in the cache storage;
a candidate cache management unit configured to hold an access frequency for each candidate entry of a plurality of candidate entries not registered to the cache storage; and
a cache update unit configured to:
  update the access frequency of one of a cache entry of the plurality of cache entries or a candidate entry of the plurality of candidate entries based on an address of an issued access command;
  update the cache entry and the candidate entry based on the updated access frequency;
  register the candidate entry to the cache management unit as a new cache entry in a case where the access frequency of the candidate entry exceeds a cache-in threshold; and
  delete the candidate entry from the candidate cache management unit based on the registration of the candidate entry to the cache management unit.

9. The storage device according to claim 8, wherein the cache storage includes a non-volatile memory having an upper limit in number of writes.

10. An information processing system, comprising:
a host computer;
a main storage;
a cache storage configured to store part of data stored in the main storage;
a cache management unit configured to hold an access frequency for each cache entry of a plurality of cache entries in the cache storage;
a candidate cache management unit configured to hold an access frequency for each candidate entry of a plurality of candidate entries not registered to the cache storage; and
a cache update unit configured to:
  update the access frequency of one of a cache entry of the plurality of cache entries or a candidate entry of the plurality of candidate entries based on an address of an access command issued by the host computer;
  update the cache entry and the candidate entry based on the updated access frequency;
  register the candidate entry to the cache management unit as a new cache entry in a case where the access frequency of the candidate entry exceeds a cache-in threshold; and
  delete the candidate entry from the candidate cache management unit based on the registration of the candidate entry to the cache management unit.

11. A storage control device, comprising:
a cache management unit configured to hold an access frequency for each cache entry of a plurality of cache entries in a cache storage, where the cache storage stores part of data stored in a main storage;
a candidate cache management unit configured to hold an access frequency for each candidate entry of a plurality of candidate entries not registered to the cache storage; and
a cache update unit configured to:
  update the access frequency of one of a cache entry of the plurality of cache entries or a candidate entry of the plurality of candidate entries based on an address of an issued access command;

update the cache entry and the candidate entry based on the updated access frequency; and set the candidate entry as a deletion candidate in a case where the access frequency of the candidate entry falls below a candidate cache-out threshold.

* * * * *